Nov. 21, 1950 R. S. McKINZEY 2,531,071
MOIST AIR FILTER
Filed May 7, 1946 2 Sheets-Sheet 1
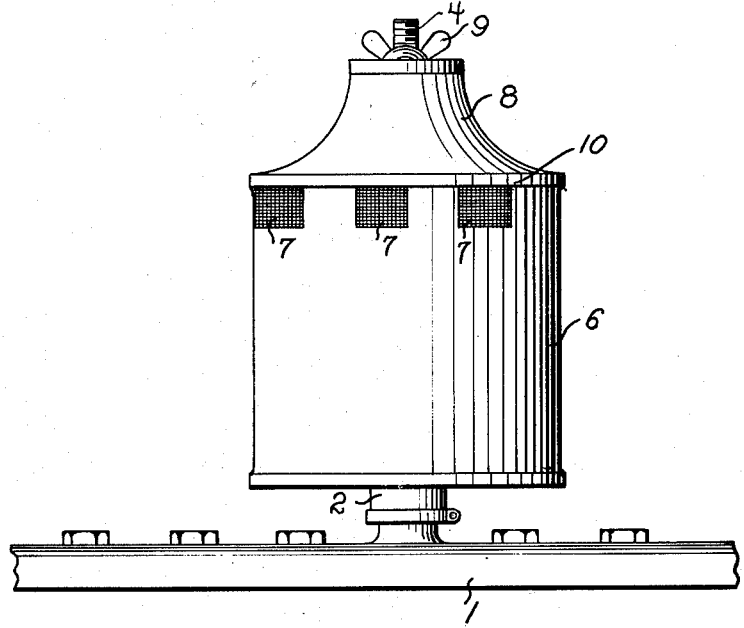
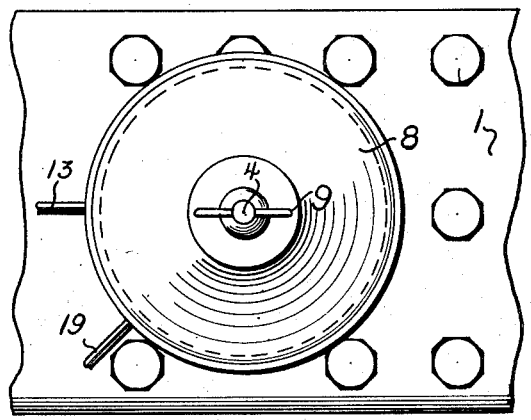 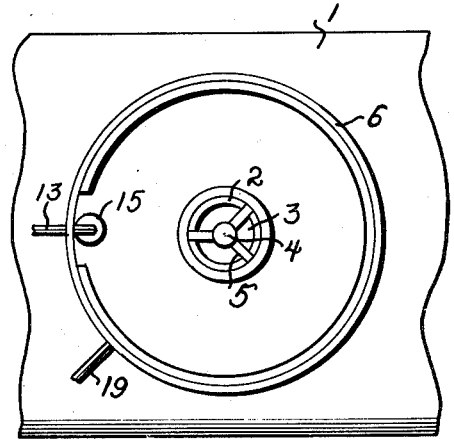
INVENTOR.
Reuben S. McKinzey
BY Victor J. Evans & Co.
ATTORNEYS Nov. 21, 1950

R. S. McKINZEY 2,531,071

MOIST AIR FILTER

Filed May 7, 1946

INVENTOR.
Reuben S. McKinzey
BY Victor J. Evans & Co.
ATTORNEYS

Patented Nov. 21, 1950

2,531,071

UNITED STATES PATENT OFFICE 2,531,071

MOIST AIR FILTER

Reuben S. McKinzey, Lawton, Okla.

Application May 7, 1946, Serial No. 667,957

1 Claim. (Cl. 261—107)

My present invention relates to an improved moist air filter of the type especially adapted for use with internal combustion engines as used on automobiles, trucks, and other mobile engines, or with stationary engines.

The principal object of my invention is the provision of an air filter for gasoline engines which will provide clean moistened air to the carburetor.

The value of moist air in gasoline engine operation is well known, and the device of my invention contemplates the function with facility and efficiency.

In the accompanying drawings I have illustrated one complete example of the physical embodiment of my invention according to the best mode I have thus far devised but it will be understood that various changes and alterations may be made in the exemplified structure within the scope of the appended claim.

In the drawings:

Figure 1 is a side elevational view of the filter of my invention.

Figure 2 is a top plan view thereof.

Figure 3 is a top plan view of the filter with the cap removed.

Figure 4:
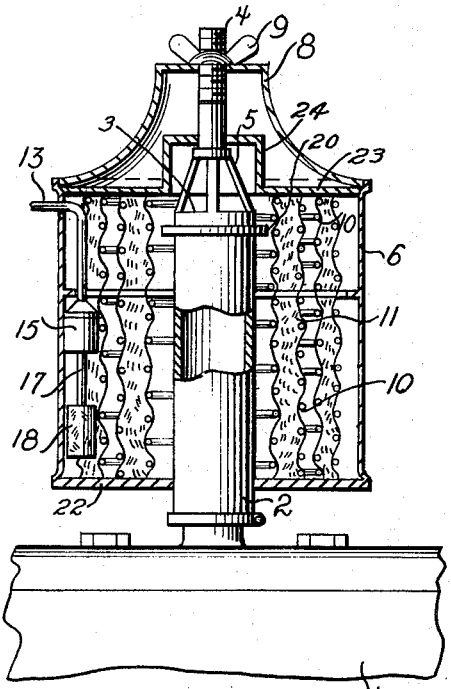
Figure 4 is a vertical sectional view of the filter and housing.
Figure 5:
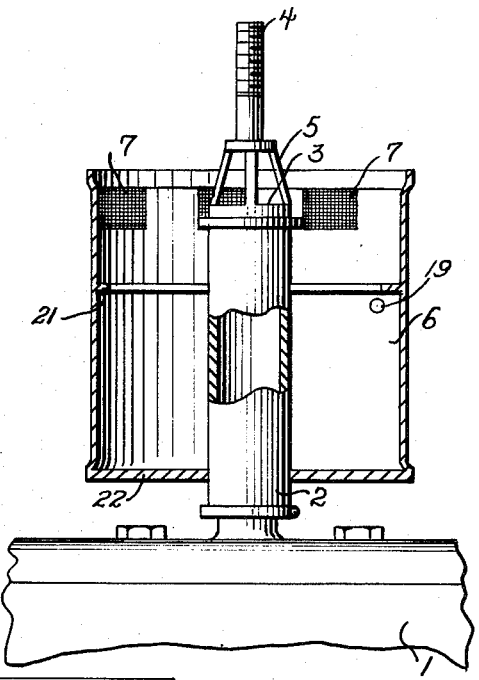
Figure 5 is a vertical sectional view of the housing.
Figure 6:
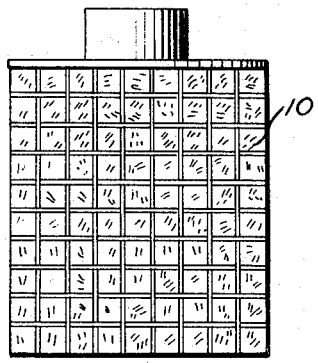
Figure 6 is a side elevational view of the filter element.
Figure 7:
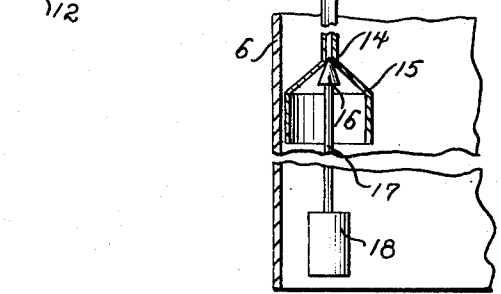
Figure 7 is an assembly view showing the water tank and a portion of the filter.

Referring now to the drawings in detail I have illustrated an intake manifold for the carburetor as at 1 and upon the manifold I have shown a vertically extending open pipe or tube 2. This pipe is formed with an open upper end 3 and a bolt 4 is secured above the open end by a spider having ribs 5. The inner passage of the pipe communicates with the interior of the intake manifold.

A housing 6 cylindrical in shape and formed with air ports 7 is adapted to be mounted upon the pipe 2 and a cap 8 for the housing is secured in position by wing nut 9 on the bolt 4. The cylindrical housing is provided with a lower end 22 and an upper end 23 and the upper end is provided with an inverted cup-like section 24 that extends over the spider and rests on the upper end thereof.

Interior spaced partitions of porous material as wire screen or other suitable material shown at 10 form receptacles for sponges 11, or other absorbent and retaining material.

A water tank 12 is located on the vehicle or in the case of a stationary engine adjacent thereto, and a pipe 13 leads from the tank into the housing of the filter. The pipe terminates in a valve seat 14 and the flared end 15 guides the valve 16 on the rod 17 in its upward seating movement under control of the float 18. An overflow pipe 19 provides for the carrying off of excess water in case of stoppage or failure of the controls.

The water flows by gravity from the tank past the valve filling the bottom of the housing in which rests the lower portion of the screen partitions and the sponges. As the level of the water raises the valve cuts off the flow until the level lowers due to the indrawn air passing through the ports and the screens and over and into the open end of the pipe to the manifold. The water is prevented from passing over the top of the tube 2 by means of the annular splash guard 20 secured thereon below the open top 3 and the water is also prevented from rising too high to interfere with ports 7 by the annular splash guard 21 formed on the interior wall of the housing 6.

The air in passing through the screens and sponges is cleaned, cooled, and moistened and in reaching the carburetor increases the efficiency of the motor operation.

The filter sponges and screen may easily be removed for cleaning by simply removing the wing nut and cap and taking out the filter.

In cold weather, the water may be mixed with anti-freeze solutions, or a conventional oil filter may be substituted for the water filter.

In dry weather such as is experienced in the Middle West and other relatively dry areas large quantities of water will be consumed in the driving, the water fed to the housing being drawn upwardy by capillary attraction, and the water or moisture removed from sponges by the passage of air through the screens.

Having thus fully described my invention what I claim as new and desire to secure by Letters Patent is:

In a motor vehicle air filter, the combination which comprises a vertically disposed centrally positioned tube having an opening in the lower end for positioning the tube over the intake of a carbureter, a spider having spaced ribs extended upwardly and inwardly from the upper end of the tube, a vertically positioned bolt carried by the upper end of the spider, a cylindrical housing spaced from and positioned around the tube, said housing having upper and lower ends with a centrally disposed opening in the lower end for receiving the tube and with an upwardly extended inverted cup-like centrally positioned section in the upper end and said cup-like section extended upwardly over the spider on the upper end of the tube and resting upon the upper end of said spider, a conical shape cap positioned on the upper end of the housing with the said bolt on the spider extended therethrough, a thumb nut on said bolt for clamping the cap against the end of the housing, spaced vertically disposed cylindrical shape partitions of absorbent material positioned in the housing for suspending moisture from water in the lower end of the housing in the upper part thereof, comparatively large mesh wire cylinders covering the surfaces of said partitions with the openings therein permitting free passage of air through the said partitions, said housing having spaced inlet openings covered with wire mesh in the upper end thereof, and a float control valve having a water inlet pipe extended therefrom for maintaining water at a predetermined elevation in said housing.

REUBEN S. McKINZEY.

REFERENCES CITED

The following references are of record in the file of this patent:

UNITED STATES PATENTS

| Number | Name | Date |
|---|---|---|
| 1,330,574 | Barksdale | Feb. 10, 1920 |
| 1,490,931 | La Rose | Apr. 22, 1924 |
| 2,046,093 | Schaaf | June 30, 1936 |